United States Patent
Ensign et al.

(10) Patent No.: US 11,767,388 B1
(45) Date of Patent: Sep. 26, 2023

(54) SILICON-FUNCTIONALIZED RUBBER

(71) Applicant: THE GOODYEAR TIRE & RUBBER COMPANY, Akron, OH (US)

(72) Inventors: Seth Cody Ensign, Akron, OH (US); Margaret Flook Vielhaber, Kent, OH (US); Jena Lynn Johngrass, Cleveland, OH (US); Liqing Ma, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 379 days.

(21) Appl. No.: 17/023,633

(22) Filed: Sep. 17, 2020

Related U.S. Application Data

(60) Provisional application No. 62/902,093, filed on Sep. 18, 2019.

(51) Int. Cl.
| | |
|---|---|
| *C08F 236/06* | (2006.01) |
| *C08F 236/08* | (2006.01) |
| *C08F 236/10* | (2006.01) |
| *C08F 4/52* | (2006.01) |
| *C08F 8/30* | (2006.01) |
| *C08F 8/42* | (2006.01) |
| *C08F 212/08* | (2006.01) |
| *C08K 3/04* | (2006.01) |
| *C08K 3/36* | (2006.01) |
| *B60C 1/00* | (2006.01) |
| *C08F 2/38* | (2006.01) |
| *C08F 236/14* | (2006.01) |
| *C08F 4/54* | (2006.01) |

(52) U.S. Cl.
CPC ............ *C08F 236/06* (2013.01); *B60C 1/0016* (2013.01); *C08F 2/38* (2013.01); *C08F 4/52* (2013.01); *C08F 4/545* (2013.01); *C08F 212/08* (2013.01); *C08F 236/08* (2013.01); *C08F 236/14* (2013.01); *C08K 3/04* (2013.01); *C08K 3/36* (2013.01); *C08F 2810/40* (2013.01)

(58) Field of Classification Search
CPC ..... C08F 236/00; C08F 236/06; C08F 236/08; C08F 236/14; C08F 4/52; C08F 4/545; C08F 2/38; C08C 19/25; C08C 19/22
See application file for complete search history.

(56) References Cited

U.S. PATENT DOCUMENTS

| | | | |
|---|---|---|---|
| 3,297,667 A | 1/1967 | von Dohlen et al. | |
| 3,676,441 A | 7/1972 | Nikles | |
| 3,794,604 A | 2/1974 | Throckmorton et al. | |
| 4,242,232 A | 12/1980 | Sylvester et al. | |
| 4,260,707 A | 4/1981 | Sylvester et al. | |
| 4,429,089 A | 1/1984 | Pedretti et al. | |
| 4,444,903 A | 4/1984 | Carbonaro et al. | |
| 4,461,883 A | 7/1984 | Takeuchi et al. | |
| 4,533,711 A | 8/1985 | Takeuchi et al. | |
| 4,663,405 A | 5/1987 | Throckmorton | |
| 4,820,751 A | 4/1989 | Takeshita et al. | |
| 4,822,844 A | 4/1989 | Kawakami et al. | |
| 4,866,131 A | 9/1989 | Fujimaki et al. | |
| 4,894,420 A | 1/1990 | Scriver | |
| 5,227,425 A | 7/1993 | Rauline | |
| 5,502,126 A | 3/1996 | Bell et al. | |
| 5,652,310 A | 7/1997 | Hsu et al. | |
| 5,659,101 A | 8/1997 | Biagini et al. | |
| 5,686,371 A | 11/1997 | Ansell et al. | |
| 6,136,931 A | 10/2000 | Jang et al. | |
| 6,255,416 B1 | 7/2001 | Sone et al. | |
| 6,273,162 B1 * | 8/2001 | Ohara et al. | B60C 1/0008 152/546 |
| 6,378,582 B1 | 4/2002 | Sandstrom et al. | |
| 7,750,087 B2 * | 7/2010 | Ozawa et al. | C08L 7/00 525/377 |
| 8,765,887 B2 | 7/2014 | Luo | |

FOREIGN PATENT DOCUMENTS

EP        0299074 B1    1/1992

* cited by examiner

*Primary Examiner* — Irina S Zemel
*Assistant Examiner* — Jeffrey S Lenihan
(74) *Attorney, Agent, or Firm* — Alvin T. Rockhill

(57) ABSTRACT

The compatibility between silica fillers and synthetic rubbers which are synthesized utilizing lanthanide-based catalyst systems, such as neodymium catalyst systems can be improved by terminating the polymerization with a vinyl silane terminating agent. In doing so the vinyl silane is allowed to react with the polymer chain ends of the neodymium rubber to functionalize the chain ends of the polymer chains with silicon containing groups. This results in the rubber having better characteristics for utilization in tire rubber formulations, such a tire tread formulations, that exhibit improved wear characteristics and lower rolling resistance. The process for the synthesis of such functionalized polydiene rubber comprises (1) polymerizing a diene monomer in the presence of a lanthanide-based catalyst system, and (2) terminating the polymerization with a vinyl silane terminator. The functionalized polydiene rubber composition made by this method is comprised of a polydiene rubber which is functionalized at its chain ends with a silicon containing group.

20 Claims, No Drawings

SILICON-FUNCTIONALIZED RUBBER

This application claims benefit of U.S. Provisional Pat. Application Serial No. 62/902,093, filed on Sep. 18, 2019. The teachings of U.S. Provisional Pat. Application Serial No. 62/902,093 are incorporated herein by reference in their entirety.

BACKGROUND OF THE INVENTION

Neodymium salts activated with aluminum alkyl co-catalysts have been known to catalyze the polymerization of conjugated dienes since the early 1960's. To date, many papers and patents have been published which describe variations and improvements to the original systems (see U.S. Pat. 3,297,667, U.S. Pat. 3,676,441, and U.S. Pat. 3,794,604). Much of this work was driven by the eventual commercialization of high cis-polybutadiene in the 1980's for the use in tire applications (see U.S. Pat. 4,242,232, U.S. Pat. 4,260,707, U.S. Pat. 4,699,960, and U.S. Pat. 4,444,903).

The type of catalyst system employed and its method of preparation are crucial to the success of the polymerization. Traditionally, there are two main types of catalyst systems, the first is a ternary system based on soluble neodymium carboxylates in conjunction with an alkylaluminum co-catalyst and a halogen source (see R. P. Quirk, A. M. Kells, K. Yunlu, J.-P. Cuif, *Polymer* 41, 5903 (2000) and A. Pross, P. Marquardt, K. H. Reichert, W. Nentwig, T. Knauf, *Angew. Makromol. Chem.* 211, 89 (1993)). The second system is a binary catalyst comprising an insoluble neodymium halide complexed with three equivalence of a Lewis base such as an alcohol, amine, or phosphonate and an alkylaluminum activator (see H. Iovu, G. Hubca, E. Simionescu, E. Badea, J. S. Hurst, *Eur. Polymer J.* 33, 811 (1997); H. Iovu, G. Hubca, D. Racoti, J. S. Hurst, *Eur. Polymer J.* 35, 335 (1999); and J. H. Yang, M. Tsutsui, Z. Chen, D. Bergbreiter, *Macromolecules* 15, 230 (1982)).

In general, the two systems behave similarly; however, the ternary system appears to have gained acceptance commercially in the production of polybutadiene (see D. J. Wilson, *J. Polym. Sci., Part A.* 33, 2505 (1995)). Typically, the most active ternary systems consist of treating a branched long chain neodymium carboxylate with branched trialkylaluminum or dialkylaluminum hydrides, in an Al/Nd ratio between 10-40/1, and the use of 2-3 equivalents of a halide source, such as diethylaluminum chloride or tert-butylchloride.

The active catalyst is typically prepared in one of two ways. The simplest method is to generate the catalyst in-situ by sequentially introducing the catalyst components to the polymerization solution. It is usually most effective to introduce the aluminum alkyl components first, thereby scavenging impurities from the premix prior to contact with the neodymium salt. The other method for catalyst preparation is to preform the catalyst components prior to introducing them into the polymerization vessel. The most common practice involves sequentially treating the catalyst components in the presence of at least a few equivalents of monomer followed by an aging period. For example U.S. Pat. 3,794,604 discloses an improved preforming technique which is carried out in the presence of a small portion of a conjugated diene.

Aging the catalyst components with a diene prior to polymerization results in a more active catalyst then when the conjugated diene is absent. The disclosed technique for catalyst formation is to age after all of the components have been mixed together. U.S. Pat. 4,429,089 also teaches the use of a diolefin during catalyst formation and states that the particular procedure which is followed has no bearing on the polymerization run. Likewise, U.S. Pat. 4,461,883 discloses that the use of a conjugated diene in the catalyst make-up is preferable for improving the activity of the catalyst. In this example, the diene is mixed with the catalyst components at any time in the preforming step with aging occurring after all components are mixed together.

U.S. Pat. 4,533,711 teaches the practice of adding the catalyst components together first followed by the addition of a small amount of diene and then aging the preformed catalyst. This patent states that the diene is not essential in the make-up but it does serve to increase catalyst activity. U.S. Pat. 4,663,405 continues to teach the use of conjugated dienes as components in preformed catalysts. It goes on to state that soluble catalysts result when diolefins are present in the make-up while insoluble catalysts frequently result when no diene is present. This patent teaches a process where aging of the catalyst occurs after the reagents are added.

U.S. Pat. 5,502,126 again practices the use of a diene in the preformed catalyst make-up and again states that it is preferred to age the catalyst after the labile halogen compound is added. In U.S. Pat. 5,659,101 the use of a diolefin in conjunction with a boron derived halogen source results in a preformed catalyst that partially forms a solid precipitate in aliphatic solvents.

When silicone halides are used, as in U.S. Pat. 5,686,371, aging in the presence of a diene again is performed after the addition of all the catalyst components. U.S. Pat. 6,136,931 discloses an improved boron halide dependent preformed catalyst that has excellent solubility in non-polar solvents. Finally, U.S. Pat. 6,255,416 also practice preformed catalyst generation in the presence of a small amount of diene. Aging in this case again occurs after all of the catalyst components are mixed.

It is highly desirable for tires to exhibit good traction characteristics on both dry and wet surfaces. However, it has traditionally been very difficult to improve the traction characteristics of a tire without compromising its rolling resistance and tread wear. Low rolling resistance is important because good fuel economy is virtually always an important consideration. Good tread wear is also an important consideration because it is generally the most important factor that determines the life of the tire.

The traction, tread wear and rolling resistance of a tire is dependent to a large extent on the dynamic viscoelastic properties of the elastomers utilized in making the tire tread. In order to reduce the rolling resistance of a tire, rubbers having a high rebound have traditionally been utilized in making the tread formulation of the tire. On the other hand, in order to increase the wet skid resistance of a tire, rubbers which undergo a large energy loss have generally been utilized in the tire tread rubber formulation. In order to balance these two viscoelastically inconsistent properties, mixtures of various types of synthetic and natural rubber are normally utilized in tire treads. For instance, various mixtures of styrene-butadiene rubber, high cis-1,4-polybutadiene rubber, synthetic polyisoprene rubber, and natural rubber are commonly used as a rubber material for automobile and truck tire treads. However, such blends are not totally satisfactory for all purposes. For instance, the inclusion of styrene-butadiene rubber (SBR) in tire tread formulations can significantly improve the traction characteristics of tires made therewith. However, styrene is a relatively expensive monomer and the inclusion of SBR in tire tread formulations leads to increased costs and in some cases to higher level of rolling resistance.

Carbon black is generally included in rubber compositions which are employed in making tires and most other rubber articles. In fact, carbon black has been utilized as a filler in tire rubber formulations since the beginning of the tire industry and has traditionally been employed as a filler in virtually all types of tires for automobiles, trucks, airplanes, tractors, agricultural equipment, motorcycles, and for use in other applications.

It is desirable to attain the best possible dispersion of the carbon black throughout the rubber to attain optimized properties. It is also highly desirable to improve the interaction between the carbon black and the rubber. By improving the affinity of the rubber compound to the carbon black, physical properties can be improved. Silica can also be included in tire tread formulations to improve rolling resistance and other tire performance characteristics. In fact, silica is now being widely used as a filler in tire rubber formulations and is of particular value for use in the tread rubber formulations of high performance tires. This is because reinforcing silica fillers can provide unique benefits that cannot be attained by using only carbon black as the sole filler.

In contrast to carbon black, reinforcing silica fillers are polar materials. By virtue of its polar nature, silica filler does not mix very well with nonpolar hydrocarbons, such as those commonly used in vehicle tires. This lack of interaction or incompatibility between the silica filler and the rubber typically causes a lower level of tensile strength and wear resistance than is usually experiences with similar rubbers which utilize carbon black as a filler. The most common approach for dealing with this problem is to include a silica coupling agent in rubber formulations that utilize silica as a reinforcing filler.

Silica coupling agents link the silica filler to the rubber by covalently bonding with both the silica filler and the rubber. For instance, hydrolysable triethoxysilyl moieties of the coupling agent can react with the silica filler while vulcanizable tetra-sulfur linkages in the coupling agent react with the rubber. A widely utilized silica coupling agent is bis-(3-triethoxysilylpropyl) tetrasulfide, which is also known in the tire and rubber industry as Si69. Generally, a large excess of silica coupling agent (more than 6 parts per hundred parts of rubber) is required to attain the desired results.

Over the years, numerous solutions have been proposed to decrease the rolling resistance of tires by modifying the rubber compositions used in tread rubber formulations. Thus, for rubber compositions that are reinforced with carbon black, it was initially proposed to reduce the content of carbon black. For instance, U.S. Pat. 4,822,844 proposes to use carbon black having specific characteristics expressed by a specific iodine absorption surface (IA) and nitrogen absorption surface (N.sub.2 SA), as well as by an average size of well-defined carbon particles. Another solution described in U.S. Pat. 4,866,131 proposes a tire tread composition which is comprised of a low molecular weight copolymer of butadiene and styrene (SBR) prepared in solution in mixture with another conventional copolymer prepared in solution or emulsion. U.S. Pat. 4,894,420 proposes to use a tread formed of a blend of cis 1,4-polyisoprene and a diene/acrylonitrile copolymer. However, none of the solutions proposed up to now have proven to be totally satisfactory since the improvement in the rolling resistance is accompanied by a decrease in one or more essential properties, such as the reduction of adherence on wet and/or snow-covered surfaces or a reduction in the resistance to wear.

It has also been proposed to use white fillers, such as silica, bentonite, clay, titanium oxide, talc, and the like, as reinforcing fillers. Such white fillers have the advantage of not being obtained from petroleum and decreasing the rolling resistance of tire treads manufactured therewith. However, in view of the resultant decline in the properties, in particular the decline in the resistance to wear, the use of silica in tread compositions is still an exception and frequently represented only a minority fraction of the total filler as described in U.S. Pat. 4,894,420 and U.S. Pat. No. 4,820,751. In order to remedy this situation, European Patent Application 299,074 proposes a rubber composition comprising silica, as reinforcing filler, in very large proportions and which is based on a polymer which is functionalized by means of a special alkoxy silane compound having a non-hydrolyzable alkoxy group. However, this solution is restrictive in that it permits the use only of a very specific family of silanes, which constitutes a handicap for industrial use.

U.S. Pat. 5,227,425 discloses a sulfur-vulcanizable rubber composition obtained by thermomechanical working of a conjugated diene compound and an aromatic vinyl compound prepared by solution polymerization in a hydrocarbon solvent having a total content of aromatic vinyl compound of between 5 percent and 50 percent and a glass transition temperature (Tg) of between 0° C. and -80° C. with 30 to 150 parts by weight per 100 parts by weight of elastomer of a silica having a BET surface area of between 100 and 250 m²/g, a CTAB surface area of between 100 and 250 m²/g, an oil absorption measured in DBP of between 150 and 250 ml/100 g and an average projected area of the aggregates greater than 8500 nm² before use and between 7000 and 8400 nm² after thermomechanical mixing as well as the additives conventionally employed, with the exception of the sulfur vulcanization system, comprising at least one heat step reaching a temperature of between 130° C. and 180° C. for a suitable period of time of between 10 seconds and 20 minutes which is a function of the temperature selected in order to carry out the mechanical work and of the nature and volume of the components subjected to the mechanical work, followed by a finishing step consisting of the incorporating of the vulcanization system by mechanical work at a temperature below the vulcanization temperature. However, it is essential to utilize a rubbery polymer containing a vinyl aromatic monomer made by solution polymerization, such as solution SBR, in such tire tread compositions.

U.S. Pat. 6,378,582 reveals a tire tread compound that is highly loaded with silica. This compound is touted as offering the advantages of silica compounding without the need for solution styrene-butadiene rubber (SSBR). More specifically, this tire tread rubber formulation is reported to offer an excellent combination of traction, treadwear and rolling resistance characteristics. The highly silica-loaded tread rubber formulations described in U.S. Pat. 6,378,582 are comprised of (1) high vinyl polybutadiene rubber and (2) tin-coupled isoprene-butadiene rubber.

U.S. Pat. 5,652,310 discloses a process for modifying a rubbery polymer to improve silica interaction which comprises the steps of: (1) metallating the rubbery polymer with lithium by reacting the rubbery polymer with an organo lithium compound in the presence of a member selected from the group consisting of alkali metal alkoxides, alkali metal phenoxides and chelating tertiary alkyl 1,2-ethylene diamines to produce a metallated rubbery polymer; and (2) reacting the metallated rubbery polymer with a silicon containing compound to produce the modified rubbery polymer having improved silica interaction, wherein the silicon containing compound is selected from the group consisting of silanes and siloxanes, wherein said silanes and siloxanes contain at least two functional groups which can be the same or different and which are selected from the group consisting of alkoxy groups, tertiary amino groups, cyano groups, sulfonyl groups, epoxy groups and halogen atoms; and wherein the reaction between the metallated rubbery polymer and the silicon containing compound is conducted in the presence of a member selected from the group consisting of alkali metal alkoxides, alkali metal phenoxides and chelating tertiary alkyl 1,2-ethylene diamines.

U.S. Pat. 8,765,887 discloses a process for preparing a polydiene rubber which comprises polymerizing a conjugated diene monomer with a lanthanide-based catalyst system in the presence of a vinyl-silane, an allylsilane, or an allylvinylsilane. U.S. Pat. 8,765,887 indicates that suitable vinylsilanes include, but are not limited to, vinyldimethylsilane, vinyltrimethylsilane, vinyltriethylsilane, vinyltriphenylsilane, vinyl-t-butyldimethylsilane, vinyl-di-n-octylmethylsilane, vinylphenylmethylsilane, vinylphenyl dimethylsilane, vinyl(trifluoromethyl)dimethylsilane, divinyldimethylsilane, trivinylsilane, trivinylmethylsilane, tetravinylsilane, tris(vinyldimethylsiloxy)methylsilane, tris(vinyldimethylsiloxy)phenylsilane, vinyldimethylfluorosilane, vinyldimethylchlorosilane, vinyldiphenylchlorosilane, vinylphenylmethylchlorosilane, vinylmethyldichlorosilane, vinylphenyldichlorosilane, vinyltrichlorosilane, divinyldichlorosilane, trivinylchlorosilane, vinyl(chloromethyl) dimethylsilane, vinyl(bromomethyl)dimethylsilane, vinyldimethylmethoxysilane, vinylphenylmethylmethoxysilane, vinyldimethylethoxysilane, vinyldiphenylethoxysilane, vinylmethyldimethoxysilane, vinylmethyldiethoxysilane, vinylphenyldiethoxysilane, vinyltrimethoxysilane, vinyltriethoxysilane, vinyltriisopropoxysilane, vinyltri-t-butoxysilane, vinyltriisopropenoxysilane, vinyltriphenoxysilane, vinyltris(2-methoxyethoxy)silane, vinyltris(methoxypropoxy)silane, trivinylmethoxysilane, trivinylethoxysilane, vinylsilatrane, vinylmethylbis(trimethylsiloxy)silane, vinyltris(dimethylsiloxy)silane, vinyltris(trimethylsiloxy)silane, tetrakis(vinyldimethylsiloxy)silane, vinylmethyldiacetoxysilane, vinyltriacetoxysilane, vinylmethylbis(dimethylamino)silane, 1-propenylmethyldichlorosilane, 2-propenyltrimethylsilane, 1-bromovinyltrimethylsilane, 2-bromovinyltrimethylsilane, (1-methoxyvinyl)trimethylsilane, vinylmethylsilacyclopentane, vinyltetramethyldisiloxane, vinylpentamethyldisiloxane, 1,3-divinyltetramethyldisiloxane, 1,3-divinyl-1,3-diphenyl-1,3-dimethyldisiloxane, 1,3-divinyltetraphenyldisiloxane, 1,1,3,3-tetravinyldimethyldisilazane, 1,3-divinyltetraethoxydisiloxane, 1,3-divinyltetrakis(trimethylsiloxy)disiloxane, 1-vinyl-3-(chloromethyl)-1,1,3,3-tetramethyldisiloxane, 1,3-divinyl-1,3-dimethyl-1,3-dichlorodisiloxane, 1,2-divinyltetramethyldisilane, 1,4-divinyltetramethyldisilylethane, 1,4-bis(vinyldimethylsilyl)benzene, tris(vinyldimethylsilyl)borate, 1,5-divinylhexamethyltrisiloxane, 1,5-divinyl-3-phenylpentamethyltrisiloxane, 1,5-divinyl-3,3-diphenyl-1,1,5,5-tetramethyltrisiloxane, 1,3,5-trivinyl-1,1,3,5,5-pentamethyltrisiloxane, 1,3,5-trivinyl-1,3,5-trimethylcyclotrisiloxane, 1,3,5,7-tetravinyl-1,3,5,7-tetramethylcyclotetrasiloxane, and octavinyl-T8-silsesquioxane. Representative examples of suitable allylsilanes are reported to include, but are not limited to, allyldimethylsilane, allyltrimethylsilane, allyltriisopropylsilane, allyltriphenylsilane, diallyldimethylsilane, diallyldiphenylsilane, triallylmethylsilane, tetraallylsilane, ally(chloromethyl)dimethylsilane, allyldimethylchlorosilane, allyldichlorosilane, allylmethyldichlorosilane, allylphenyldichlorosilane, allyl(chloropropyl)dichlorosilane, allyltrichlorosilane, (2-chloromethylallyl)trichlorosilane, allyldimethoxysilane, allyltrimethoxysilane, allyltriethoxysilane, allyltriphenoxysilane, allyltris(trimethylsiloxy) silane, (2-chloromethylallyl)trimethoxysilane, allyldimethyl(diisopropylamino)silane, 1,1-bis(trimethylsilylmethyl)ethylene, 1,1-bis(trichlorosilylmethyl)ethylene, 1,1-bis(trimethoxysilylmethyl)ethylene, methallyltrimethylsilane, 1-allyl-1,1,3,3-tetramethyldisiloxane, 1,3-diallyltetramethyldisiloxane, and 1,3-diallyltetrakis(trimethylsiloxy) disiloxane. The allylvinylsilanes that can be used include, but are not limited to, allylvinylmethylsilane, allylvinylphenylsilane, allylvinyldimethylsilane, allylvinyldiphenylsilane, allyltrivinylsilane, diallyldivinylsilane, triallylvinylsilane, allylvinylchlorosilane, allylvinyldichlorosilane, allylvinyldifluorosilane, allylvinyldimethoxysilane, allylvinyldiethoxysilane, allylvinyldiphenoxysilane, allylvinylbis(trimethylsiloxy)silane, allylvinyldiacetoxysilane, and allylvinylbis(dimethylamino)silane.

There is still a long felt need for better compatibility between rubbery elastomers and reinforcing silica fillers. More specifically, in tire applications better rubber-filler compatibility translates into enhanced tire performance characteristics, such as improved tread-wear, enhanced wet and dry traction, and better fuel economy (less rolling resistance). For these reasons, synthetic rubbers which are more compatible with standard reinforcing silica fillers are being sought. For instance, there is currently a need for synthetic rubbers made with neodymium catalyst systems that exhibit enhanced compatibility with reinforcing silica fillers.

SUMMARY OF THE INVENTION

The subject invention discloses a technique for improving the compatibility between silica fillers and synthetic rubbers which are synthesized utilizing lanthanide-based catalyst systems, such as a neodymium catalyst system. This is accomplished by terminating the polymerization with a vinyl silane terminating agent. In doing so the vinyl silane is allowed to react with the polymer chain ends of the rubber to functionalize the chain ends of the polymer chains with silicon containing groups. This results in the rubber having better characteristics for utilization in tire rubber formulations, such a tire tread formulations, that exhibit improved wear characteristics and lower rolling resistance.

This invention more specifically discloses a process for the synthesis of a functionalized polydiene rubber which comprises (1) polymerizing a diene monomer in the presence of a lanthanide-based catalyst system, and (2) terminating the polymerization with a vinyl silane terminator.

The subject invention further reveals a functionalized polydiene rubber composition which is comprised of a polydiene rubber which is functionalized at its chain ends with a silicon containing group.

The present invention also discloses a rubber formulation which is comprised of (1) a functionalized polydiene rubber composition which is comprised of a polydiene rubber which is functionalized at its chain ends with a silicon containing group and (2) a reinforcing silica filler.

The subject invention further relates to a tire which is comprised of a generally toroidal-shaped carcass with an outer circumferential tread, two spaced beads, at least one ply extending from bead to bead and sidewalls extending radially from and connecting said tread to said beads, wherein said circumferential tread is adapted to be ground-contacting, wherein the circumferential tread is comprised of a rubber formulation which is comprised of (1) a functionalized polydiene rubber composition which is comprised of a polydiene rubber which is functionalized at its chain ends with a silicon containing group and (2) a reinforcing silica filler.

DETAILED DESCRIPTION OF THE INVENTION

The conventional lanthanide-based catalyst systems are used in polymerizing diene monomers to synthesize the functionalized polydiene rubbers of this invention. Such polymerizations are typically conducted in a hydrocarbon solvent that can be one or more aromatic, paraffinic, or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, normal hexane, benzene, toluene, xylene, ethylbenzene, and the like, alone or in admixture.

In solution polymerizations that utilize the lanthanide-based catalyst systems of this invention, there will normally be from 5 to 35 weight percent monomers in the polymerization medium. Such polymerization mediums are, of course, comprised of an organic solvent, monomers, and the lanthanide-based catalyst system. In most cases, it will be preferred for the polymerization medium to contain from 10 to 30 weight percent monomers. It is generally more preferred for the polymerization medium to contain 12 to 18 weight percent monomers.

The lanthanide-based catalyst systems utilized in the practice of this invention are comprised of (a) a lanthanide compound, (b) an alkylating agent, and (c) a halogen source. Lanthanide-containing compounds useful in the present invention are those compounds that include lanthanum, neodymium, cerium, praseodymium, promethium, samarium, europium, gadolinium, terbium, dysprosium, holmium, erbium, thulium, ytterbium, lutetium, or didymium. In one embodiment, these compounds can include neodymium, lanthanum, samarium, or didymium. As used herein, the term "didymium" shall denote a commercial mixture of rare-earth elements obtained from monazite sand. In addition, the lanthanide-containing compounds useful in the present invention can be in the form of elemental lanthanide.

The lanthanide atom in the lanthanide-containing compounds can be in various oxidation states including, but not limited to, the 0, +2, +3, and +4 oxidation states. In one embodiment, a trivalent lanthanide-containing compound, where the lanthanide atom is in the +3 oxidation state, can be employed. Suitable lanthanide-containing compounds include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide .β-diketonates, lanthanide alkoxides or aryloxides, lanthanide halides, lanthanide pseudo-halides, lanthanide oxyhalides, and organolanthanide compounds.

In one or more embodiments, the lanthanide-containing compounds can be soluble in hydrocarbon solvents such as aromatic hydrocarbons, aliphatic hydrocarbons, or cycloaliphatic hydrocarbons. Hydrocarbon-insoluble lanthanide-containing compounds, however, may also be useful in the present invention, as they can be suspended in the polymerization medium to form the catalytically active species.

For ease of illustration, further discussion of useful lanthanide-containing compounds will focus on neodymium compounds, although those skilled in the art will be able to select similar compounds that are based upon other lanthanide metals.

Suitable neodymium carboxylates include, but are not limited to, neodymium formate, neodymium acetate, neodymium acrylate, neodymium methacrylate, neodymium valerate, neodymium gluconate, neodymium citrate, neodymium fumarate, neodymium lactate, neodymium maleate, neodymium oxalate, neodymium 2-ethylhexanoate, neodymium neodecanoate (neodymium versatate), neodymium naphthenate, neodymium stearate, neodymium oleate, neodymium benzoate, and neodymium picolinate.

Suitable neodymium organophosphates include, but are not limited to, neodymium dibutyl phosphate, neodymium dipentyl phosphate, neodymium dihexyl phosphate, neodymium diheptyl phosphate, neodymium dioctyl phosphate, neodymium bis(1-methylheptyl) phosphate, neodymium bis(2-ethylhexyl) phosphate, neodymium didecyl phosphate, neodymium didodecyl phosphate, neodymium dioctadecyl phosphate, neodymium dioleyl phosphate, neodymium diphenyl phosphate, neodymium bis(p-nonylphenyl) phosphate, neodymium butyl (2-ethylhexyl) phosphate, neodymium (1-methylheptyl) (2-ethylhexyl) phosphate, and neodymium (2-ethylhexyl) (p-nonylphenyl) phosphate.

Suitable neodymium organophosphonates include, but are not limited to, neodymium butyl phosphonate, neodymium pentyl phosphonate, neodymium hexyl phosphonate, neodymium heptyl phosphonate, neodymium octyl phosphonate, neodymium (1-methylheptyl) phosphonate, neodymium (2-ethylhexyl) phosphonate, neodymium decyl phosphonate, neodymium dodecyl phosphonate, neodymium octadecyl phosphonate, neodymium oleyl phosphonate, neodymium phenyl phosphonate, neodymium (p-nonylphenyl) phosphonate, neodymium butyl butylphosphonate, neodymium pentyl pentylphosphonate, neodymium hexyl hexylphosphonate, neodymium heptyl heptylphosphonate, neodymium octyl octylphosphonate, neodymium (1-methylheptyl) (1-methylheptyl)phosphonate, neodymium (2-ethylhexyl) (2-ethylhexyl)phosphonate, neodymium decyl decylphosphonate, neodymium dodecyl dodecylphosphonate, neodymium octadecyl octadecylphosphonate, neodymium oleyl oleylphosphonate, neodymium phenyl phenylphosphonate, neodymium (p-nonylphenyl) (p-nonylphenyl)phosphonate, neodymium butyl (2-ethylhexyl)phosphonate, neodymium (2-ethylhexyl) butylphosphonate, neodymium (1-methylheptyl) (2-ethylhexyl)phosphonate, neodymium (2-ethylhexyl) (1-methylheptyl)phosphonate, neodymium (2-ethylhexyl) (p-nonylphenyl)phosphonate, and neodymium (p-nonylphenyl) (2-ethyl hexyl) phosphonate.

Suitable neodymium organophosphinates include, but are not limited to, neodymium butylphosphinate, neodymium pentylphosphinate, neodymium hexylphosphinate, neodymium heptylphosphinate, neodymium octylphosphinate, neodymium (1-methylheptyl)phosphinate, neodymium (2-ethylhexyl)phosphinate, neodymium decylphosphinate, neodymium dodecylphosphinate, neodymium octadecylphosphinate, neodymium oleylphosphinate, neodymium phenylphosphinate, neodymium (p-nonylphenyl)phosphinate, neodymium dibutylphosphinate, neodymium dipentylphosphinate, neodymium dihexylphosphinate, neodymium diheptylphosphinate, neodymium dioctylphosphinate, neodymium bis(1-methylheptyl)phosphinate, neodymium bis(2-ethylhexyl)phosphinate, neodymium didecylphosphinate, neodymium didodecylphosphinate, neodymium dioctadecylphosphinate, neodymium dioleylphosphinate, neodymium diphenylphosphinate, neodymium bis(p-nonylphenyl) phosphinate, neodymium butyl (2-ethylhexyl) phosphinate, neodymium (1-methylheptyl)(2-ethylhexyl)

phosphinate, and neodymium (2-ethylhexyl)(p-nonylphenyl)phosphinate

Suitable neodymium carbamates include, but are not limited to, neodymium dimethylcarbamate, neodymium diethylcarbamate, neodymium diisopropylcarbamate, neodymium dibutylcarbamate, and neodymium dibenzylcarbamate. Suitable neodymium dithiocarbamates include, but are not limited to, neodymium dimethyldithiocarbamate, neodymium diethyldithiocarbamate, neodymium diisopropyldithiocarbamate, neodymium dibutyldithiocarbamate, and neodymium dibenzyldithiocarbamate. Suitable neodymium xanthates include, but are not limited to, neodymium methylxanthate, neodymium ethylxanthate, neodymium isopropylxanthate, neodymium butylxanthate, and neodymium benzylxanthate. Suitable neodymium .beta.-diketonates include, but are not limited to, neodymium acetylacetonate, neodymium trifluoroacetylacetonate, neodymium hexafluoroacetylacetonate, neodymium benzoylacetonate, and neodymium 2,2,6,6-tetramethyl-3,5-heptanedionate. Suitable neodymium alkoxides or aryloxides include, but are not limited to, neodymium methoxide, neodymium ethoxide, neodymium isopropoxide, neodymium 2-ethylhexoxide, neodymium phenoxide, neodymium nonylphenoxide, and neodymium naphthoxide.

Suitable neodymium halides include, but are not limited to, neodymium fluoride, neodymium chloride, neodymium bromide, and neodymium iodide. Suitable neodymium pseudo-halides include, but are not limited to, neodymium cyanide, neodymium cyanate, neodymium thiocyanate, neodymium azide, and neodymium ferrocyanide. Suitable neodymium oxyhalides include, but are not limited to, neodymium oxyfluoride, neodymium oxychloride, and neodymium oxybromide. A Lewis base, such as tetrahydrofuran ("THF"), may be employed as an aid for solubilizing this class of neodymium compounds in inert organic solvents. Where lanthanide halides, lanthanide oxyhalides, or other lanthanide-containing compounds containing a halogen atom are employed, the lanthanide-containing compound may also serve as all or part of the halogen source in the above-mentioned catalyst system.

As used herein, the term "organolanthanide compound" refers to any lanthanide-containing compound containing at least one lanthanide-carbon bond. These compounds are predominantly, though not exclusively, those containing cyclopentadienyl ("Cp"), substituted cyclopentadienyl, allyl, and substituted allyl ligands. Suitable organolanthanide compounds include, but are not limited to, $Cp_3Ln$, $Cp_2LnR$, $Cp_2LnCl$, $CpLnCl_2$, CpLn (cyclooctatetraene), $(C_5Me_5)_2LnR$, $LnR_3$, $Ln(allyl)_3$, and $Ln(allyl)_2Cl$, where Ln represents a lanthanide atom, and R represents a hydrocarbyl group. As used herein, the term "hydrocarbyl" shall denote a monovalent group formed by removing a hydrogen atom from a hydrocarbon. In one or more embodiments, hydrocarbyl groups useful in the present invention may contain heteroatoms such as, for example, nitrogen, oxygen, boron, silicon, sulfur, and phosphorus atoms.

As mentioned above, the catalyst systems of the present invention can include one or more alkylating agents. In one or more embodiments, alkylating agents, which may also be referred to as hydrocarbylating agents, include organometallic compounds that can transfer one or more hydrocarbyl groups to another metal. Typically, these agents include organometallic compounds of electropositive metals such as Groups 1, 2, and 3 metals (Groups IA, IIA, and IIIA metals). Alkylating agents useful in the present invention include, but are not limited to, organoaluminum and organomagnesium compounds. As used herein, the term "organoaluminum compound" refers to any aluminum compound containing at least one aluminum-carbon bond. In one or more embodiments, organoaluminum compounds that are soluble in a hydrocarbon solvent can be employed. As used herein, the term "organomagnesium compound" refers to any magnesium compound that contains at least one magnesium-carbon bond. In one or more embodiments, organomagnesium compounds that are soluble in a hydrocarbon can be employed. As will be described in more detail below, several species of suitable alkylating agents can be in the form of a halide. Where the alkylating agent includes a halogen atom, the alkylating agent may also serve as all or part of the halogen source in the above-mentioned catalyst system.

In one or more embodiments, organoaluminum compounds that can be utilized include those represented by the general formula $AlR_nX_{3-n}$, where each R independently can be a monovalent organic group that is attached to the aluminum atom via a carbon atom, where each X independently can be a hydrogen atom, a halogen atom, a carboxylate group, an alkoxide group, or an aryloxide group, and where n can be an integer in the range of from 1 to 3. In one or more embodiments, each R independently can be a hydrocarbyl group such as, for example, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing in the range of from 1 carbon atom, or the appropriate minimum number of carbon atoms to form the group, up to about 20 carbon atoms. These hydrocarbyl groups may contain heteroatoms including, but not limited to, nitrogen, oxygen, boron, silicon, sulfur, and phosphorus atoms.

Types of the organoaluminum compounds that are represented by the general formula $AlR_nX_{3-n}$ include, but are not limited to, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds. In one embodiment, the alkylating agent can comprise trihydrocarbylaluminum, dihydrocarbylaluminum hydride, and/or hydrocarbylaluminum dihydride compounds. In one embodiment, when the alkylating agent includes an organoaluminum hydride compound, the above-mentioned halogen source can be provided by a tin halide, as disclosed in U.S. Pat. 7,008,899, which is incorporated herein by reference in its entirety.

Suitable trihydrocarbylaluminum compounds include, but are not limited to, trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Suitable dihydrocarbylaluminum hydride compounds include, but are not limited to, diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Suitable hydrocarbylaluminum dihydrides include, but are not limited to, ethylaluminum dihydride, n-propylaluminum dihydride, isopropylaluminum dihydride, n-butylaluminum dihydride, isobutylaluminum dihydride, and n-octylaluminum dihydride. Suitable dihydrocarbylaluminum halide compounds include, but are not limited to, diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride.

Suitable hydrocarbylaluminum dihalide compounds include, but are not limited to, ethylaluminum dichloride, n-propylaluminum dichloride, isopropylaluminum dichloride, n-butylaluminum dichloride, isobutylaluminum dichloride, and n-octylaluminum dichloride. Other organoaluminum compounds useful as alkylating agents that may be represented by the general formula $AlR_nX_{3-n}$ include, but are not limited to, dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methyl aluminum diphenoxide, ethylaluminum diphenoxide, and isobutylaluminum diphenoxide.

Another class of organoaluminum compounds suitable for use as an alkylating agent in the present invention is aluminoxanes. Aluminoxanes can comprise oligomeric linear aluminoxanes or oligomeric cyclic aluminoxanes. Such aluminoxanes can be prepared by reacting trihydro carbylaluminum compounds with water. This reaction can be performed according to known methods, such as, for example, (1) a method in which the trihydrocarbylaluminum compound is dissolved in an organic solvent and then contacted with water, (2) a method in which the trihydrocarbylaluminum compound is reacted with water of crystallization contained in, for example, metal salts, or water adsorbed in inorganic or organic compounds, or (3) a method in which the trihydrocarbylaluminum compound is reacted with water in the presence of the monomer or monomer solution that is to be polymerized.

Suitable aluminoxane compounds include, but are not limited to, methylaluminoxane ("MAO"), modified methylaluminoxane ("MMAO"), ethylaluminoxane, n-propylaluminoxane, isopropylaluminoxane, butylaluminoxane, isobutylaluminoxane, n-pentylaluminoxane, neopentyl aluminoxane, n-hexylaluminoxane, n-octylaluminoxane, 2-ethylhexylaluminoxane, cyclohexylaluminoxane, 1-methylcyclopentylaluminoxane, phenylaluminoxane, and 2,6-dimethylphenylaluminoxane. Modified methylaluminoxane can be formed by substituting about 20 to 80 percent of the methyl groups of methylaluminoxane with $C_2$ to $C_{12}$ hydrocarbyl groups, preferably with isobutyl groups, by using techniques known to those skilled in the art.

Aluminoxanes can be used alone or in combination with other organoaluminum compounds. In one embodiment, methylaluminoxane and at least one other organoaluminum compound (e.g., $AlR_nX_{3-n}$), such as diisobutyl aluminum hydride, can be employed in combination. U.S. Pat. Application Publication No. 2008/0182954, which is incorporated herein by reference in its entirety, provides other examples where aluminoxanes and organoaluminum compounds can be employed in combination.

As previously noted, alkylating agents useful in the present invention can comprise organomagnesium compounds. In one or more embodiments, organomagnesium compounds that can be utilized include those represented by the general formula $MgR_2$, where each R independently can be a monovalent organic group that is attached to the magnesium atom via a carbon atom. In one or more embodiments, each R independently can be a hydrocarbyl group including, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, silicon, sulfur, and phosphorus atoms.

Suitable organomagnesium compounds that may be represented by the general formula $MgR_2$ include, but are not limited to, diethylmagnesium, di-n-propylmagnesium, diisopropylmagnesium, dibutylmagnesium, dihexylmagnesium, diphenylmagnesium, and dibenzylmagnesium.

Another class of organomagnesium compounds that can be utilized as an alkylating agent may be represented by the general formula RMgX, where R can be a monovalent organic group that is attached to the magnesium atom via a carbon atom, and X can be a hydrogen atom, a halogen atom, a carboxylate group, an alkoxide group, or an aryloxide group. Where the alkylating agent is an organomagnesium compound that includes a halogen atom, the organomagnesium compound can serve as both the alkylating agent and at least a portion of the halogen source in the catalyst systems of the present invention. In one or more embodiments, R can be a hydrocarbyl group including, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, boron, silicon, sulfur, and phosphorus atoms. In one embodiment, X can be a carboxylate group, an alkoxide group, or an aryloxide group, with each group containing in the range of from 1 to about 20 carbon atoms.

Types of organomagnesium compounds that may be represented by the general formula RMgX include, but are not limited to, hydrocarbylmagnesium hydride, hydrocarbylmagnesium halide, hydrocarbylmagnesium carboxylate, hydrocarbylmagnesium alkoxide, and hydrocarbylmagnesium aryloxide. Suitable organomagnesium compounds that may be represented by the general formula RMgX include, but are not limited to, methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexyl magnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, and benzylmagnesium phenoxide.

As previously noted, the catalyst systems of the present invention can include a halogen source. As used herein, the term "halogen source" refers to any substance including at least one halogen atom. In one or more embodiments, at least a portion of the halogen source can be provided by either the above-described lanthanide-containing compound and/or the above-described alkylating agent and/or vinylsilane, allylsilane, or allylvinylsilane, as will be described below, when those compounds contain at least one halogen atom. In other words, the lanthanide-containing compound can serve as both the lanthanide-containing compound and at least a portion of the halogen source. Similarly, the alkylating agent can serve as both the alkylating agent and at least a portion of the halogen source. Similarly, the vinylsilane, allylsilane, or allylvinylsilane can serve as both the respective silane and at least a portion of the halogen source.

In another embodiment, at least a portion of the halogen source can be present in the catalyst systems in the form of a separate and distinct halogen-containing compound. Various compounds, or mixtures thereof, that contain one or more halogen atoms can be employed as the halogen source. Examples of halogen atoms include, but are not limited to, fluorine, chlorine, bromine, and iodine. A combination of two or more halogen atoms can also be utilized. Halogen-containing compounds that are soluble in a hydrocarbon solvent are suitable for use in the present invention. Hydrocarbon-insoluble halogen-containing compounds, however, can be suspended in a polymerization system to form the catalytically active species, and are therefore also useful.

Useful types of halogen-containing compounds that can be employed include, but are not limited to, elemental halogens, mixed halogens, hydrogen halides, organic halides, inorganic halides, metallic halides, and organometallic halides. Elemental halogens suitable for use in the present invention include, but are not limited to, fluorine, chlorine, bromine, and iodine. Some specific examples of suitable mixed halogens include iodine monochloride, iodine monobromide, iodine trichloride, and iodine pentafluoride. Hydrogen halides include, but are not limited to, hydrogen fluoride, hydrogen chloride, hydrogen bromide, and hydrogen iodide.

Organic halides include, but are not limited to, t-butyl chloride, t-butyl bromide, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane, benzoyl chloride, benzoyl bromide, propionyl chloride, propionyl bromide, methyl chloroformate, and methyl bromoformate.

Inorganic halides include, but are not limited to, phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride, silicon tetrabromide, silicon tetraiodide, arsenic trichloride, arsenic tribromide, arsenic triiodide, selenium tetrachloride, selenium tetrabromide, tellurium tetrachloride, tellurium tetrabromide, and tellurium tetraiodide.

Metallic halides include, but are not limited to, tin tetrachloride, tin tetrabromide, aluminum trichloride, aluminum tribromide, antimony trichloride, antimony pentachloride, antimony tribromide, aluminum triiodide, aluminum trifluoride, gallium trichloride, gallium tribromide, gallium triiodide, gallium trifluoride, indium trichloride, indium tribromide, indium triiodide, indium trifluoride, titanium tetrachloride, titanium tetrabromide, titanium tetraiodide, zinc dichloride, zinc dibromide, zinc diiodide, and zinc difluoride.

Organometallic halides include, but are not limited to, dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride, isobutylaluminum sesquichloride, methylmagnesium chloride, methylmagnesium bromide, methylmagnesium iodide, ethylmagnesium chloride, ethylmagnesium bromide, butylmagnesium chloride, butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, dibutyltin dichloride, dibutyltin dibromide, tributyltin chloride, and tributyltin bromide.

In one or more embodiments, the above-described catalyst systems can comprise a compound containing a non-coordinating anion or a non-coordinating anion precursor. In one or more embodiments, a compound containing a non-coordinating anion, or a non-coordinating anion precursor can be employed in lieu of the above-described halogen source. A non-coordinating anion is a sterically bulky anion that does not form coordinate bonds with, for example, the active center of a catalyst system due to steric hindrance. Non-coordinating anions useful in the present invention include, but are not limited to, tetraarylborate anions and fluorinated tetraarylborate anions. Compounds containing a non-coordinating anion can also contain a counter cation, such as a carbonium, ammonium, or phosphonium cation. Exemplary counter cations include, but are not limited to, triarylcarbonium cations and N,N-dialkylanilinium cations. Examples of compounds containing a non-coordinating anion and a counter cation include, but are not limited to, triphenylcarbonium tetrakis(pentafluorophenyl)borate, N,N-dimethylanilinium tetrakis(pentafluorophenyl)borate, triphenylcarbonium tetrakis[3,5-bis(trifluoromethyl)phenyl]borate, and N,N-dimethylanilinium tetrakis[3,5-bis(trifluoromethyl)phenyl]borate.

A non-coordinating anion precursor can also be used in this embodiment. A non-coordinating anion precursor is a compound that is able to form a non-coordinating anion under reaction conditions. Useful non-coordinating anion precursors include, but are not limited to, triarylboron compounds, $BR_3$, where R is a strong electron-withdrawing aryl group, such as a pentafluorophenyl or 3,5-bis(trifluoromethyl)phenyl group.

The catalyst composition of this invention may be formed by combining or mixing the foregoing catalyst ingredients. Although one or more active catalyst species are believed to result from the combination of the catalyst ingredients, the degree of interaction or reaction between the various catalyst ingredients or components is not known with any great degree of certainty. The combination or reaction product of the lanthanide compound, the alkylating agent, and the halogen source may be referred to as a catalyst system or catalyst composition. In this respect, reference to catalyst ingredients refers to the lanthanide compound, the alkylating agent, and the halogen source. The term modified catalyst composition or modified catalyst system may be employed to encompass a simple mixture of the ingredients, a complex of the various ingredients that is caused by physical or chemical forces of attraction, a chemical reaction product of the ingredients, or a combination of the foregoing.

The catalyst composition of this invention advantageously has a technologically useful catalytic activity for polymerizing conjugated dienes into polydienes over a wide range of catalyst concentrations and catalyst ingredient ratios. Several factors may impact the optimum concentration of any one of the catalyst ingredients. For example, because the catalyst ingredients may interact to form an active species, the optimum concentration for any one catalyst ingredient may be dependent upon the concentrations of the other catalyst ingredients.

In one or more embodiments, the molar ratio of the alkylating agent to the lanthanide compound (alkylating agent/Ln) can be varied from about 1:1 to about 1,000:1, in other embodiments from about 2:1 to about 500:1, and in other embodiments from about 5:1 to about 200:1.

In those embodiments where both an aluminoxane and at least one other organoaluminum agent are employed as alkylating agents, the molar ratio of the aluminoxane to the lanthanide compound (aluminoxane/Ln) can be varied from 5:1 to about 1,000:1, in other embodiments from about 10:1 to about 700:1, and in other embodiments from about 20:1 to about 500:1; and the molar ratio of the at least one other organoaluminum compound to the lanthanide compound (Al/Ln) can be varied from about 1:1 to about 200:1, in other embodiments from about 2:1 to about 150:1, and in other embodiments from about 5:1 to about 100:1.

The molar ratio of the halogen source to the lanthanide compound is best described in terms of the ratio of the moles of halogen atoms in the halogen source to the moles of lanthanide atoms in the lanthanide compound (halogen/Ln). In one or more embodiments, the halogen/Ln molar ratio can be varied from about 0.5:1 to about 20:1, in other embodiments from about 1:1 to about 10:1, and in other embodiments from about 2:1 to about 6:1.

In relevant embodiments, the molar ratio of the non-coordinating anion or non-coordinating anion precursor to the lanthanide compound (An/Ln) may be from about 0.5:1 to about 20:1, in other embodiments from about 0.75:1 to about 10:1, and in other embodiments from about 1:1 to about 6:1.

In one or more embodiments, the molar ratio of the silane compound to the lanthanide compound (silane/Ln) can be varied from 0.5:1 to about 1,000:1, in other embodiments from about 1:1 to about 700:1, and in other embodiments from about 5:1 to about 500:1.

The catalyst systems of this invention can be formed by employing several techniques. For example, the catalyst systems may be formed by adding the catalyst components directly to the monomer to be polymerized. In this respect, the catalyst components may be added either in a stepwise or simultaneous manner. In one embodiment, when the catalyst ingredients are added in a stepwise manner, the alkylating agent can be added first, followed by the lanthanide compound, and ultimately followed by the halogen source. The addition of the catalyst components directly and individually to the monomer to be polymerized may be referred to as an in situ formation of the catalyst system.

In other embodiments, the catalyst may be preformed. That is, the catalyst ingredients including the silane compound may be introduced and pre-mixed outside of the monomer to be polymerized. In particular embodiments, the preformation of the catalyst may occur either in the absence of any monomer or in the presence of a small amount of at least one conjugated diene monomer at an appropriate temperature, which is generally within the range of about -20° C. to about 80° C. Mixtures of conjugated diene monomers can also be used. The amount of conjugated diene monomer that may be used for preforming the catalyst can range from about 1 to about 500 moles, in other embodiments from about 5 to about 250 moles, and in other embodiments from about 10 to about 100 moles per mole of the lanthanide compound. The resulting preformed catalyst composition can be aged, if desired, prior to being added to the monomer that is to be polymerized.

In other embodiments, the catalyst may be formed by using a two-stage procedure. The first stage can involve combining the lanthanide compound with the alkylating agent either in the absence of any monomer or in the presence of a small amount of at least one conjugated diene monomer at an appropriate temperature, such as a temperature which is within the range of -20° C. to about 80° C. The amount of monomer employed in preparing this first-stage mixture may be similar to that set forth above for preforming the catalyst. In the second stage, the mixture prepared in the first stage and the halogen source can be added in either a stepwise or simultaneous manner to the monomer that is to be polymerized.

In one or more embodiments, a solvent may be employed as a carrier to either dissolve or suspend the catalyst or catalyst ingredients in order to facilitate the delivery of the catalyst or catalyst ingredients to the polymerization system. In other embodiments, conjugated diene monomer can be used as the catalyst carrier. In yet other embodiments, the catalyst ingredients can be used in their neat state without any solvent (in bulk).

In one or more embodiments, suitable solvents include those organic compounds that will not undergo polymerization or incorporation into propagating polymer chains during the polymerization of monomer in the presence of catalyst. In one or more embodiments, these organic species are liquid at ambient temperature and pressure. In one or more embodiments, these organic solvents are inert to the catalyst. Exemplary organic solvents include hydrocarbons with a low or relatively low boiling point such as aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Mixtures of the above hydrocarbons may also be used. As is known in the art, aliphatic and cycloaliphatic hydrocarbons may be desirably employed for environmental reasons. The low-boiling hydrocarbon solvents are typically separated from the polymer upon completion of the polymerization.

Other examples of organic solvents include high-boiling hydrocarbons of high molecular weights, such as paraffinic oil, aromatic oil, or other hydrocarbon oils that are commonly used to oil-extend polymers. Since these hydrocarbons are non-volatile, they typically do not require separation and remain incorporated in the polymer.

The production of polydiene rubbers according to this invention can be accomplished by polymerizing conjugated diene monomer in the presence of a catalytically effective amount of the foregoing catalyst composition. The introduction of the catalyst composition, the conjugated diene monomer, and any solvent if employed forms a polymerization mixture in which the polymer product is formed. The total catalyst concentration to be employed in the polymerization mixture may depend on the interplay of various factors such as the purity of the ingredients, the polymerization temperature, the polymerization rate and conversion desired, the molecular weight desired, and many other factors. Accordingly, a specific total catalyst concentration cannot be definitively set forth except to say that catalytically effective amounts of the respective catalyst ingredients can be used. In one or more embodiments, the amount of the lanthanide compound used can be varied from about 0.01 to about 2 mmol, in other embodiments from about 0.02 to about 1 mmol, and in other embodiments from about 0.05 to about 0.5 mmol per 100 g of conjugated diene monomer.

In one or more embodiments, the polymerization of conjugated diene monomer according to this invention may be carried out in a polymerization system that includes a substantial amount of solvent. In one embodiment, a solution polymerization system may be employed in which both the monomer to be polymerized and the polymer formed are soluble in the solvent. In another embodiment, a precipitation polymerization system may be employed by choosing a solvent in which the polymer formed is insoluble. In both cases, an amount of solvent in addition to the amount of solvent that may be used in preparing the catalyst is usually added to the polymerization system. The additional solvent may be the same as or different from the solvent used in preparing the catalyst. Exemplary solvents have been set forth above. In one or more embodiments, the solvent content of the polymerization mixture may be more than 20% by weight, in other embodiments more than 50% by weight, and in still other embodiments more than 80% by weight based on the total weight of the polymerization mixture.

In other embodiments, the polymerization system employed may be generally considered a bulk polymerization system that includes substantially no solvent or a minimal amount of solvent. Those skilled in the art will appreciate the benefits of bulk polymerization processes (processes where monomer acts as the solvent), and therefore the polymerization system includes less solvent than will deleteriously impact the benefits sought by conducting bulk polymerization. In one or more embodiments, the solvent content of the polymerization mixture may be less than about 20% by weight, in other embodiments less than about 10% by weight, and in still other embodiments less than about 5% by weight based on the total weight of the polymerization mixture. In still another embodiment, the polymerization mixture is substantially devoid of solvent, which refers to the absence of that amount of solvent that would otherwise have an appreciable impact on the polymerization process. Polymerization systems that are substantially devoid of solvent may be referred to as including substantially no solvent. In particular embodiments, the polymerization mixture is devoid of solvent.

The polymerization may be conducted in any conventional polymerization vessels known in the art. In one or more embodiments, solution polymerization can be conducted in a conventional stirred-tank reactor. In other embodiments, bulk polymerization can be conducted in a conventional stirred-tank reactor, especially if the monomer conversion is less than about 60%. In still other embodiments, especially where the monomer conversion in a bulk polymerization process is higher than about 60%, which typically results in a highly viscous cement, the bulk polymerization may be conducted in an elongated reactor in which the viscous cement under polymerization is driven to move by piston, or substantially by piston. For example, extruders in which the cement is pushed along by a self-cleaning single-screw or double-screw agitator are suitable for this purpose. Examples of useful bulk polymerization processes are disclosed in U.S. Pat. 7,351,776, which is incorporated herein by reference.

In one or more embodiments, all of the ingredients used for the polymerization can be combined within a single vessel, such as a conventional stirred-tank reactor, and all steps of the polymerization process can be conducted within this vessel. In other embodiments, two or more of the ingredients can be pre-combined in one vessel and then transferred to another vessel where the polymerization of monomer (or at least a major portion thereof) may be conducted.

The polymerization can be carried out as a batch process, a continuous process, or a semi-continuous process. In the semi-continuous process, the monomer is intermittently charged as needed to replace that monomer already polymerized. In one or more embodiments, the conditions under which the polymerization proceeds may be controlled to maintain the temperature of the polymerization mixture within a range from about -10° C. to about 200° C., in other embodiments from about 0° C. to about 150° C., and in other embodiments from about 20° C. to about 100° C. In one or more embodiments, the heat of polymerization may be removed by external cooling by a thermally controlled reactor jacket, internal cooling by evaporation and condensation of the monomer through the use of a reflux condenser connected to the reactor, or a combination of the two methods. Also, conditions may be controlled to conduct the polymerization under a pressure of from about 0.1 atmosphere to about 50 atmospheres, in other embodiments from about 0.5 atmosphere to about 20 atmosphere, and in other embodiments from about 1 atmosphere to about 10 atmospheres. In one or more embodiments, the pressures at which the polymerization may be carried out include those that ensure that the majority of the monomer is in the liquid phase. In these or other embodiments, the polymerization mixture may be maintained under anaerobic conditions.

The polydienes produced by the polymerization process of this invention may possess pseudo-living characteristics, such that some of polymer chains in these polymers have reactive chain ends. Once a desired monomer conversion is achieved the vinyl silane terminating agent will be introduced into the polymerization mixture to react with any reactive polymer chains so as to provide the functionalized rubber of this invention.

Once the polymerization mixture has been quenched, the various constituents of the polymerization mixture may be recovered. In one or more embodiments, the unreacted monomer can be recovered from the polymerization mixture. For example, the monomer can be distilled from the polymerization mixture by using techniques known in the art. In one or more embodiments, a devolatilizer may be employed to remove the monomer from the polymerization mixture. Once the monomer has been removed from the polymerization mixture, the monomer may be purified, stored, and/or recycled back to the polymerization process.

The functionalized rubber may be recovered from the polymerization mixture by using techniques known in the art. In one or more embodiments, desolventization and drying techniques may be used. For instance, the polymer can be recovered by passing the polymerization mixture through a heated screw apparatus, such as a desolventizing extruder, in which the volatile substances are removed by evaporation at appropriate temperatures (about 100° C. to about 170° C.) and under atmospheric or sub-atmospheric pressure. This treatment serves to remove unreacted monomer as well as any low-boiling solvent. Alternatively, the polymer can also be recovered by subjecting the polymerization mixture to steam desolventization, followed by drying the resulting polymer crumbs in a hot air tunnel. The polymer can also be recovered by directly drying the polymerization mixture on a drum dryer.

Where cis-1,4-polydienes (e.g., cis-1,4-polybutadiene) are produced by one or more embodiments of the process of this invention, the cis-1,4-polydienes may advantageously have a cis-1,4 linkage content in excess of 96%, in other embodiments in excess of 97%, in other embodiments in excess of 98%, and in other embodiments in excess of 99%. Advantageously, these polymers exhibit excellent viscoelastic properties and are particularly useful in the manufacture of various tire components including, but not limited to, tire treads, sidewalls, subtreads, and bead fillers. The cis-1,4-polydienes can be used as all or part of the elastomeric component of a tire stock. When the cis-1,4-polydienes are used in conjunction with other rubbers to form the elastomeric component of a tire stock, these other rubbers may be natural rubber, synthetic rubbers, and mixtures thereof. Examples of synthetic rubber include polyisoprene, poly(styrene-co-butadiene), polybutadiene with low cis-1,4-linkage content, poly(styrene-co-butadiene-co-isoprene), and mixtures thereof. The cis-1,4-polydienes can also be used in the manufacture of hoses, belts, shoe soles, window seals, other seals, vibration damping rubber, and other industrial products.

In a preferred process the neodymium catalyst system used in the process of this invention is made by preforming three catalyst components. These components are (1) an organoaluminum compound, (2) a neodymium carboxylate, and (3) a dialkyl aluminum chloride. In making the neodymium catalyst system the neodymium carboxylate and the organoaluminum compound are first reacted together for 10 minutes to 30 minutes in the presence of isoprene to produce a neodymium-aluminum catalyst component. The neodymium carboxylate and the organoaluminum compound are preferable reacted for 15 minutes to 25 minutes.

The neodymium-aluminum catalyst component is then reacted with the dialkyl aluminum chloride for a period of at least 30 minutes to produce the neodymium catalyst system. The activity of the neodymium catalyst system normally improves as the time allowed for this step is increased up to about 24 hours. Greater catalyst activity is not normally attained by increasing the aging time over 24 hours. However, the catalyst system can be aged for much longer time periods before being used with out any detrimental results.

The neodymium catalyst system will typically be preformed at a temperature that is within the range of about -10° C. to about 60° C. The neodymium catalyst system will more typically be prepared at a temperature that is within the range of about 0° C. to about 30° C. The neodymium catalyst system will preferably be prepared at a temperature that is within the range of about 5° C. to about 15° C. The period of time needed for the catalyst to be preformed is increased by utilizing lower temperatures.

In a highly preferred embodiment of this invention the dialkyl aluminum chloride is slowly added to the neodymium-aluminum catalyst component over a period of at least 30 minutes. The dialkyl aluminum chloride is preferable slowly added to the neodymuim-aluminum catalyst component over a period of at least 45 minutes and is most preferable added over a period of at least 60 minutes. By slowly adding the dialkyl aluminum chloride to the neodymium-aluminum catalyst component over an extended period of time the first step of the process wherein the neodymium carboxylate is reacted with the organoaluminum compound is much more forgiving. More specifically, the reaction time need for the first step is not as critical and can be reduced to as short of a period as 1 minute or extended to a period as long as 12 hours at low temperatures. In this embodiment of the subject invention the neodymium carboxylate will preferable be allowed to react with the organoaluminum compound in the presence of isoprene for a period of 2 hours to 8 hours at a temperature which is within the range of 0° C. to 30° C. In this embodiment of the subject invention the neodymium carboxylate will more preferable be allowed to react with the organoaluminum compound in the presence of isoprene for a period of 4 hours to 6 hours at a temperature which is within the range of 5° C. to 15° C.

The organoaluminum compound contains at least one carbon to aluminum bond and can be represented by the structural formula:

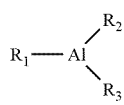

in which $R_1$ is selected from the group consisting of alkyl (including cycloalkyl), alkoxy, aryl, alkaryl, arylalkyl radicals and hydrogen: $R_2$ is selected from the group consisting of alkyl (including cycloalkyl), aryl, alkaryl, arylalkyl radicals and hydrogen and $R_3$ is selected from a group consisting of alkyl (including cycloalkyl), aryl, alkaryl and arylalkyl radicals. Representative of the compounds corresponding to this definition are: diethylaluminum hydride, di-n-propylaluminum hydride, di-n-butylaluminum hydride, diisobutylaluminum hydride, diphenylaluminum hydride, di-p-tolylaluminum hydride, dibenzylaluminum hydride, phenylethylaluminum hydride, phenyl-n-propylaluminum hydride, p-tolylethylaluminum hydride, p-tolyl-n-propylaluminum hydride, p-tolylisopropylaluminum hydride, benzylethylaluminum hydride, benzyl-n-propylaluminum hydride, and benzylisopropylaluminum hydride and other organoaluminum hydrides. Also included are ethylaluminum dihydride, butylaluminum dihydride, isobutylaluminum dihydride, octylaluminum dihydride, amylaluminum dihydride and other organoaluminum dihydrides. Also included are diethylaluminum ethoxide and dipropylaluminum ethoxide. Also included are trimethylaluminum, triethylaluminum, tri-n-propylaluminum, triisopropylaluminum, tri-n-propylaluminum, triisopropylaluminim, tri-n-butylaluminum, triisobutylaluminum, tripentylaluminum, trihexylaluminum, tricyclohexylaluminum, trioctylaluminum, triphenylaluminum, tri-p-tolylaluminum, tribenzylaluminum, ethyldiphenylaluminum, ethyl-di-p-tolylaluminum, ethyldibenzylaluminum, diethylphenylaluminum, diethyl-p-tolylaluminum, diethylbenzylaluminum and other triorganoaluminum compounds.

The neodymium carboxylate utilizes an organic monocarboxylic acid ligand that contains from 1 to 20 carbon atoms, such as acetic acid, propionic acid, valeric acid, hexanoic acid, 2-ethylhexanoic acid, neodecanoic acid, lauric acid, stearic acid and the like neodymium naphthenate, neodymium neodecanoate, neodymium octanoate, and other neodymium metal complexes with carboxylic acid containing ligands containing from 1 to 20 carbon atoms. The proportions of the catalyst components utilized in making the neodymium catalyst system of this invention can be varied widely. The atomic ratio of the halide ion to the neodymium metal can vary from about 0.1/1 to about 6/1. A more preferred ratio is from about 0.5/1 to about 3.5/1 and the most preferred ratio is about 2/1. The molar ratio of the trialkylaluminum or alkylaluminum hydride to neodymium metal can range from about 4/1 to about 200/1 with the most preferred range being from about 8/1 to about 100/1. The molar ratio of isoprene to neodymium metal can range from about 0.2/1 to 3000/1 with the most preferred range being from about 5/1 to about 500/1.

The amount of catalyst used to initiate the polymerization can be varied over a wide range. Low concentrations of the catalyst system are normally desirable in order to minimize ash problems. It has been found that polymerizations will occur when the catalyst level of the neodymium metal varies between 0.05 and 1.0 millimole of neodymium metal per 100 grams of monomer. A preferred ratio is between 0.1 and 0.3 millimole of neodymium metal per 100 grams of monomer.

The concentration of the total catalyst system employed of course, depends upon factors such as purity of the system, polymerization rate desired, temperature and other factors. Therefore, specific concentrations cannot be set forth except to say that catalytic amounts are used.

Temperatures at which the polymerization reaction is carried out can be varied over a wide range. Usually the temperature can be varied from extremely low temperatures such as -60° C. up to high temperatures, such as 150° C. or higher. Thus, the temperature is not a critical factor of the invention. It is generally preferred, however, to conduct the reaction at a temperature in the range of from about 10° C. to about 90° C. The pressure at which the polymerization is carried out can also be varied over a wide range. The reaction can be conducted at atmospheric pressure or, if desired, it can be carried out at sub-atmospheric or super-atmospheric pressure. Generally, a satisfactory polymerization is obtained when the reaction is carried out at about autogenous pressure, developed by the reactants under the operating conditions used.

There are valuable benefits associated with utilizing the rubbery polymers of this invention in making tire tread compounds which utilize silica fillers. In any case, the functionalized rubbery polymers of this invention can be compounded utilizing conventional ingredients and standard techniques. For instance, the rubbery polymers of this invention will typically be blended with a silica filler, sulfur, additional fillers (such as carbon black), accelerators, oils, waxes, scorch inhibiting agents, coupling agents and processing aids. In most cases, the rubbery polymers will be compounded with sulfur and/or a sulfur containing compound, a silica filler, at least one accelerator, at least one antidegradant, at least one processing oil, zinc oxide, optionally a tackifier resin, optionally a reinforcing resin, optionally one or more fatty acids, optionally a peptizer, optionally carbon black and optionally one or more scorch inhibiting agents. Such blends will normally contain from about 0.5 to 5 phr (parts per hundred parts of rubber by weight) of sulfur and/or a sulfur containing compound with 1 phr to 2.5 phr being preferred. It may be desirable to utilize insoluble sulfur in cases where bloom is a problem.

The silica utilized in the rubber formulations of this invention can include pyrogenic siliceous pigments, precipitated siliceous pigments and highly dispersible precipitated silicas, although highly dispersible precipitated silicas are preferred. The siliceous pigments preferably employed in this invention are precipitated silicas such as, for example, those obtained by the acidification of a soluble silicate, e.g., sodium silicate. As a general rule, the silica will have an average particle size that is within the range of about 4 nm to 120 nm, and will preferably have a particle size that is within the range of 7 nm to 60 nm. Such silicas might be characterized, for example, by having a BET surface area, as measured using nitrogen gas, preferably in the range of about 40 to about 600, and more usually in a range of about 50 to about 300 square meters per gram. The silica will preferably have a BET surface area that is within the range of about 125 m²/g to about 250 m²/g. The BET method of measuring surface area is described in the Journal of the American Chemical Society, Volume 60, page 304 (1930).

The silica may also be typically characterized by having a dibutylphthalate (DBP) absorption value in a range of about 100 to about 400 ml/100 g, and more usually about 150 to about 300 ml/100 g. The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in the practice of this invention. Some representative examples of silica that can be used in the practice of this invention includes, but is not limited to, silicas commercially available from PPG Industries under the Hi-Sil trademark, such as Hi-Sil® 210, Hi-Sil® 233 and Hi-Sil® 243, silicas commercially available from PPG Industries under the Agilon® trademark, such as Agilon® 400G, Agilon® 454G and Agilon® 458G, silicas available from Solvay, with, for example, designations of Zeosil®1085Gr, Zeosil®1115MP, Zeosil®1165MP, Zeosil® Premium and ZHRS®1200MP, and silicas available from Evonik Industries with, for example, designations Ultrasil® 5000GR, Ultrasil® 7000GR, Ultrasil® VN2, Ultrasil® VN3, and BV9000GR, and silicas available from Huber Engineered Materials with, for example, designations of Zeopol® 8745, and Zeopol® 8755LS.

The silica coupling agent will typically be a compound of the formula:

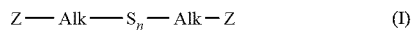

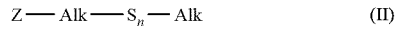

in which Z is selected from the group consisting of:

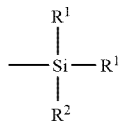 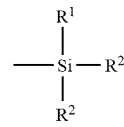 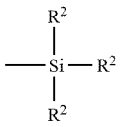

wherein $R^1$ is an alkyl group containing from 1 to 4 carbon atoms, a cyclohexyl group, or a phenyl group; wherein $R^2$ is an alkoxy group containing from 1 to 8 carbon atoms, or a cycloalkoxy group containing from 5 to 8 carbon atoms; wherein Alk is a divalent hydrocarbon of 1 to 18 carbon atoms and wherein n represents an integer from 2 to 8. The mercaptosilanes and blocked mercaptosilanes that can be used in the practice of this invention are described in International Patent Publication No. WO 2006/076670. The teachings of WO 2006/076670 are incorporated herein by reference for the purpose of describing specific mercaptosilanes and blocked mercaptosilanes that can be used in the practice of this invention. The teachings of WO 03091314 are also incorporated herein by reference for the purpose of describing specific silanes that can be utilized in the practice of this invention which emit low levels of volatile organic compounds or no volatile organic compounds.

Specific examples of sulfur containing organosilicon compounds which may be used as the silica coupling agent in accordance with the present invention include: 3,3'-bis(trimethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis(trimethoxysilyl methyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec.butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilylbuten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide, (3-Mercaptopropyl)trimethoxysilane, (3-Mercaptopropyl)triethoxysilane and 3-(Triethoxysilyl)propyl thiooctanoate.

The preferred sulfur containing organosilicon compounds are the 3,3'-bis(trimethoxy or triethoxy silylpropyl) sulfides.

The most preferred compound is 3,3'-bis(triethoxysilylpropyl) tetrasulfide. Therefore, with respect to formula I, Z is preferably

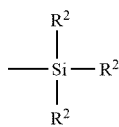

wherein R² is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The amount of the silica coupling agent that should be incorporated into the elastomeric compositions of this invention will vary depending on the level of the siliceous fillers that are included in the rubbery composition. Generally speaking, the amount of the silica coupling agent used will range from about 0.01 to about 15 parts by weight per hundred parts by weight of the siliceous fillers. Preferably, the amount of silica coupling agent utilized will range from about 1 to about 12 parts by weight per hundred parts by weight of the siliceous fillers. Preferably, the amount of silica coupling agent utilized will range from about 2 to about 10 parts by weight per hundred parts by weight of the siliceous fillers. More preferably the amount of the silica coupling agent included in the elastomeric compositions of this invention will range from about 6 to about 10 parts by weight per hundred parts by weight of the siliceous fillers.

The rubbery compositions of this invention can be compounded utilizing conventional ingredients and standard techniques. For instance, the elastomeric compositions of this invention will typically be mixed with carbon black, sulfur, additional fillers, accelerators, oils, waxes, scorch inhibiting agents, and processing aids in addition to the reinforcing silica filler.

In most cases, the elastomeric compositions of this invention will be compounded with sulfur and/or a sulfur containing compound, at least one filler, at least one accelerator, at least one antidegradant, at least one processing oil, zinc oxide, optionally a hydrocarbon resin, optionally a reinforcing resin, optionally one or more fatty acids, optionally a peptizer and optionally one or more scorch inhibiting agents. Such elastomeric compositions will normally contain from about 0.5 to 5 phr (parts per hundred parts of rubber by weight) of sulfur and/or a sulfur containing compound with 1 phr to 2.5 phr being preferred. It may be desirable to utilize insoluble sulfur in cases where bloom is a problem.

Normally the total amount of fillers utilized in the elastomeric blends of this invention will be within the range of 10 phr to 150 phr with it being preferred for such blends to contain from 30 phr to 100 phr fillers. As has been explained, the filler can be comprised solely of the reinforcing silica filler. However, in most cases at least some carbon black will be utilized in such elastomeric compositions. If carbon black is also present, the amount and type of carbon black, if used, may vary. Generally speaking, the amount of carbon black will vary from about 1 phr to about 80 phr. Preferably, the amount of carbon black will range from about 3 phr to about 50 phr. Clays and/or talc can be included in the filler to reduce cost. Starch can also be included to attain good results in some cases. In any case, the blend will also normally include from 0.1 to 2.5 phr of at least one accelerator with 0.2 phr to 1.5 phr being preferred. Antidegradants, such as antioxidants and antiozonants, will generally be included in the rubbery blends of this invention in amounts ranging from 0.25 phr to 10 phr with amounts in the range of 1 phr to 5 phr being preferred. Processing oils can be included in the blend to improve processing and reduce compound modulus although some blends, especially those based on natural rubber, may contain no processing oil. Processing oils, when present, will generally be included in the blend in amounts ranging from 2 phr to 100 phr with amounts ranging from 5 phr to 50 phr being preferred. Zinc oxide can be included in the blend as a cure activator but in some cases may not be present. Zinc oxide, when present, will normally be included in the blends from 0.5 phr to 10 phr of zinc oxide with 1 to 5 phr being preferred. These blends can optionally contain up to about 15 phr of hydrocarbon resins, up to about 10 phr of reinforcing resins, up to about 10 phr of fatty acids, up to about 10 phr of processing aid, up to about 2.5 phr of peptizers, and up to about 1 phr of scorch inhibiting agents.

Examples of processing aids that are suitable for this purpose are: fatty acids, fatty alcohols, fatty amines, fatty amides, fatty esters, fatty acid metal salts, polyols, polyethylene glycols, polypropylene glycols and natural or synthetic hydrocarbon waxes and combinations and blends thereof.

Examples of hydrocarbon resins that are suitable for this purpose are: asphalt, bitumen, indene-coumarone resins, C9 resins, C5 resins, C5/C9 resins, alkylated hydrocarbon resins, aromatic petroleum resins, styrene resins, alpha-methyl-styrene resins, styrene-alpha-methyl-styrene copolymer resins, phenolic tackifying resins, dicyclopentadiene (DCPD) resins, terpene resins, polybutene resins, rosin acids, rosin esters, dimerized rosin resins and combinations and blends thereof, etc. For example, and not intended to be limiting, see U.S. Pat. 6,525,133; U.S. Pat. 6,242,523; U.S. Pat. 6,221,953 and U.S. Pat. 5,901,766.

Tire tread formulations which include silica and an organosilicon compound will typically be mixed utilizing a thermomechanical mixing technique. The mixing of the tire tread rubber formulation can be accomplished by methods known to those having skill in the rubber mixing art. For example, the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The functionalized rubber, silica and sulfur containing organosilicon, and carbon black if used, are mixed in one or more non-productive mix stages. The terms "non-productive" and "productive" mix stages are well known to those having skill in the rubber mixing art. The sulfur vulcanizable rubber composition containing the sulfur containing organosilicon compound, vulcanizable rubber and generally at least part of the silica should be subjected to a thermomechanical mixing step. The thermomechanical mixing step generally comprises a mechanical working in a mixer or extruder for a period of time suitable in order to produce a rubber temperature which is within the range of 140° C. to 190° C. The appropriate duration of the thermomechanical working varies as a function of the operating conditions and the volume and nature of the components. For example, the thermomechanical working may be for a duration of time which is within the range of about 2 minutes to about 20 minutes. It will normally be preferred for the rubber to reach a temperature which is within the range of about 145° C. to about 180° C. and to be maintained at said temperature for a period of time which is within the range of about 4 minutes to about 12 minutes. It will normally be more preferred for the rubber to reach a temperature which is within the range of about 155° C. to about 170° C. and to be maintained at said temperature for a period of time which is within the range of about 5 minutes to about 10 minutes.

The vinyl silane terminator used in the practice of this invention will typically be of the structural formula:

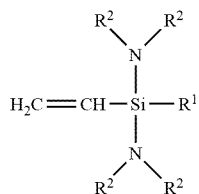

wherein $R^1$ represents an alkyl group containing from 1 to 8 carbon atoms and wherein the $R^2$ groups can be the same or different and represent alkyl groups containing from 1 to 8 carbon atoms. It is normally preferred for $R^1$ to represent an alkyl group containing from 1 to 4 carbon atoms and for $R^2$ to represent alkyl groups containing from 1 to 4 carbon atoms. It is typically most preferred for $R^1$ to represent an alkyl group containing from 1 carbon atom and for $R^2$ to represent alkyl groups containing 2 carbon atoms. The vinyl silane terminator can also be VPOS.

The rubbery polymers of this invention can be used in tire treads in conjunction with ordinary tire manufacturing techniques. Tires are built utilizing standard procedures with the rubbery polymer simply being substituted for the conventional rubber compounds typically used as the tread rubber. In any case, after the tire has been built with the functionalized rubbery polymer it can be vulcanized using a normal tire cure cycle. Tires made in accordance with this invention can be cured over a wide temperature range. However, it is generally preferred for the tires of this invention to be cured at a temperature ranging from about 132° C. (270° F.) to about 166° C. (330° F.). It is more typical for the tires of this invention to be cured at a temperature ranging from about 143° C. (290° F.) to about 154° C. (310° F.). It is generally preferred for the cure cycle used to vulcanize the tires of this invention to have a duration of about 10 to about 20 minutes with a cure cycle of about 12 to 18 minutes being most preferred.

This invention is illustrated by the following examples which are merely for the purpose of illustration and are not to be regarded as limiting the scope of the invention or the manner in which it can be practiced. Unless specifically indicated otherwise, parts and percentages are given by weight.

Example 1

In this experiment VPOS was synthesized in accordance with the following reaction:

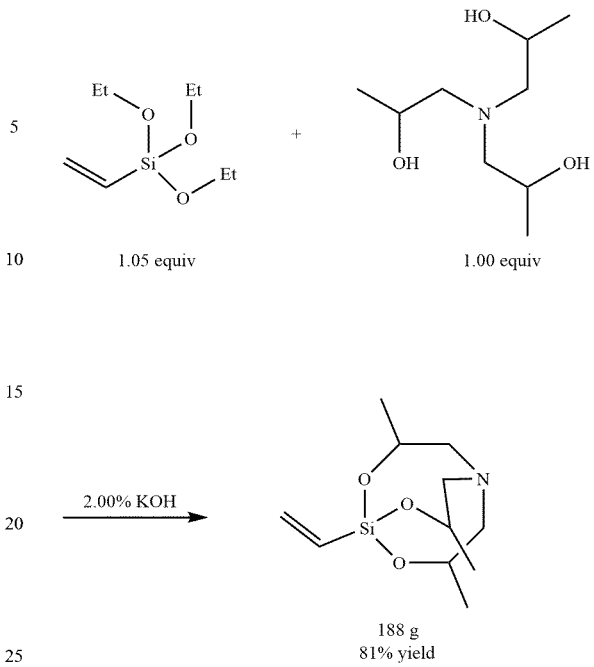

To a 1-liter round bottom flask was added triethoxyvinylsilane (211 mL, 1000 mmol, 1.05 equiv), triisopropylamine (182 g, 952 mmol, 1.00 equiv), and potassium hydroxide (1.06 g, 19.0 mmol, 2.00%). The reaction mixture was heated to 60° C. under a reduced pressure of 200 torr. Over a period of two hours, heating was maintained while the pressure was further reduced to 20 torr. Excess triethoxyvinylsilane was then removed at 65° C. and 5 torr. The reaction mixture was cooled to room temperature and crystallized overnight. The material was recrystallized from hexanes (~900 mL), filtered, and dried overnight under vacuum to obtain the pure product (188 g, 81% yield) as a white solid. The presence of the desired product was confirmed by GC and NMR.

Examples 2-5

Four oven dried 16 oz. bottles were cooled under a stream of nitrogen. After the bottles reached room temperature they were sealed with Teflon caps. The empty bottles were then weighed and fill to designated marked lines with 1,3-butadiene premix (300 ml, 14.8% w/w) via the Teflon caps. Then, triisobutylaluminum (1.52 ml, 0.88 M) and activated neodymium catalyst (1.59 ml, 0.028 M) were added to the bottles. The bottles were then tumbled in a water bath which was maintained at 65° C. for a period of 80 minutes. The bottles were then removed from water bath and additional activated neodymium catalyst (152 µL) was added as indicated in Table 1 in the case of Examples 3-5. The bottles were then shook thoroughly and VPOS was added as a a vinly silane terminator in the case of Examples 3-5. The bottles were then returned to the waterbath which was still maintained at 65° C. for indicated second reaction time. Then the bottles were cooled to room temperature and about 1 ml of water and about 1 ml isopropanol were added. The samples were then stabilize with butylated hydroxytoluene (BHT). The rubber samples were then pan dry overnight. The rubber samples were then triply precipitate using chloroform as a solvent and acetone as an antisolvent. Then, the degree of functionalization was determined by $^1$H NMR

| Example | VPOS[1] | Catalyst Add Back | Second Reaction Time | Yield | Mn (KDa) | PDI | Functionalization |
|---|---|---|---|---|---|---|---|
| 2 | 0 | No | 30 minutes | 92% | 164 | 4.1 | 0 |
| 3 | 0 | Yes | 120 minutes | 91% | 155 | 5.3 | 0 |
| 4 | 2 | Yes | 120 minutes | 94% | 148 | 10.1 | 70 |
| 5 | 5 | Yes | 120 minutes | 93% | 125 | 11.4 | 80 |

1 - Equivalents of VPOS per chain end (mol/mol)

While certain representative embodiments and details have been shown for the purpose of illustrating the subject invention, it will be apparent to those skilled in this art that various changes and modifications can be made therein without departing from the scope of the subject invention.

What is claimed is:

1. A process for the synthesis of a functionalized polydiene rubber which comprises (1) polymerizing a diene monomer in the presence of a lanthanide-based catalyst system, and (2) terminating the polymerization with a vinyl silane terminator, wherein the vinyl silane terminator is a compound of the structural formula:

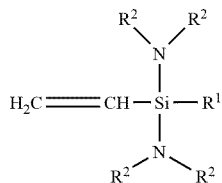

wherein $R^1$ represents an alkyl group containing from 1 to 8 carbon atoms and wherein the $R^2$ groups can be the same or different and represent alkyl groups containing from 1 to 8 carbon atoms.

2. The process of claim 1 wherein the diene monomer is 1,3-butadiene and wherein the polydiene rubber is polybutadiene rubber which is functionalized at its chain ends with a silicon containing group.

3. The process of claim 1 wherein the diene monomer is isoprene and wherein the polydiene rubber is polyisoprene rubber which is functionalized at its chain ends with a silicon containing group.

4. The process of claim 1 wherein the diene monomer is 1,3-butadiene and wherein a vinyl aromatic monomer is copolymerized with the diene monomer.

5. The process of claim 4 wherein the vinyl aromatic monomer is styrene and wherein the polydiene rubber is styrene-butadiene rubber which is functionalized at its chain ends with a silicon containing group.

6. The process of claim 1 wherein lanthanide-based catalyst system is a neodymium based catalyst system.

7. The process of claim 1 wherein $R^1$ represents an alkyl group containing from 1 to 4 carbon atoms and wherein $R^2$ represents alkyl groups containing from 1 to 4 carbon atoms.

8. The process of claim 1 wherein $R^1$ represents an alkyl group containing 1 carbon atom and wherein $R^2$ represents alkyl groups containing 2 carbon atoms.

9. The process of claim 1 wherein the termination step is carried out after a monomer conversion of at least 95% has been attained.

10. The process as specified in claim 9 further comprising adding a shortstop after the termination step to quench any remaining active catalyst.

11. The process of claim 1 wherein the termination step is carried out after a monomer conversion of at least 97% has been attained.

12. The functionalized polydiene rubber made by the process specified in claim 1.

13. A rubber formulation which is comprised of (1) the functionalized polydiene rubber composition of claim 12 and (2) a reinforcing silica filler.

14. The rubber formulation of claim 13 wherein said rubber formulation is further comprised of carbon black.

15. The rubber formulation of claim 13 wherein said rubber formulation is further comprised of a silica coupling agent.

16. A tire which is comprised of a generally toroidal-shaped carcass with an outer circumferential tread, two spaced beads, at least one ply extending from bead to bead and sidewalls extending radially from and connecting said tread to said beads, wherein said circumferential tread is adapted to be ground-contacting, wherein the circumferential tread is comprised of the rubber formulation as specified in claim 13.

17. A process for the synthesis of a functionalized polydiene rubber which comprises (1) polymerizing a diene monomer in the presence of a lanthanide-based catalyst system, and (2) terminating the polymerization with a vinyl silane terminator, wherein the vinyl silane terminator is VPOS.

18. The process of claim 17 wherein the diene monomer is 1,3-butadiene and wherein the polydiene rubber is polybutadiene rubber which is functionalized at its chain ends with a silicon containing group.

19. The process of claim 17 wherein the diene monomer is isoprene and wherein the polydiene rubber is polyisoprene rubber which is functionalized at its chain ends with a silicon containing group.

20. The process of claim 17 wherein the diene monomer is 1,3-butadiene, wherein a styrene is copolymerized with the 1,3-butadiene monomer, and wherein the polydiene rubber is styrene-butadiene rubber which is functionalized at its chain ends with a silicon containing group.

* * * * *